(12) United States Patent
Wang et al.

(10) Patent No.: US 8,989,073 B2
(45) Date of Patent: Mar. 24, 2015

(54) METHOD AND APPARATUS FOR PERFORMING CARRIER SWITCHING IN A WIRELESS COMMUNICATION SYSTEM USING MULTI-CARRIERS

(75) Inventors: Hai Wang, Beijing (CN); Lei Zhou, Beijing (CN); Xufeng Zheng, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 88 days.

(21) Appl. No.: 13/205,992

(22) Filed: Aug. 9, 2011

(65) Prior Publication Data

US 2012/0039307 A1 Feb. 16, 2012

(30) Foreign Application Priority Data

Aug. 11, 2010 (CN) .......................... 2010 1 0257791

(51) Int. Cl.
*H04W 4/06* (2009.01)
*H04W 36/06* (2009.01)
*H04L 5/00* (2006.01)
*H04W 24/10* (2009.01)
*H04W 28/06* (2009.01)
*H04W 48/16* (2009.01)
*H04W 72/12* (2009.01)

(52) U.S. Cl.
CPC ............... *H04W 36/06* (2013.01); *H04W 4/06* (2013.01); *H04L 5/0096* (2013.01); *H04W 24/10* (2013.01); *H04W 28/06* (2013.01); *H04W 48/16* (2013.01); *H04W 72/1289* (2013.01)
USPC ........................... 370/312; 370/336; 370/432

(58) Field of Classification Search
USPC .................................................. 370/312, 336
See application file for complete search history.

(56) References Cited

U.S. PATENT DOCUMENTS

| | | | | |
|---|---|---|---|---|
| 2012/0020271 | A1* | 1/2012 | Josiam et al. ................. | 370/312 |
| 2012/0287837 | A1* | 11/2012 | Kim et al. ..................... | 370/312 |
| 2012/0294222 | A1* | 11/2012 | Kim et al. ..................... | 370/312 |
| 2013/0128767 | A1* | 5/2013 | Chun et al. .................... | 370/252 |
| 2013/0136053 | A1* | 5/2013 | Kim et al. ..................... | 370/312 |

* cited by examiner

*Primary Examiner* — Anh-Vu Ly
*Assistant Examiner* — Hashim Bhatti
(74) *Attorney, Agent, or Firm* — Jefferson IP Law, LLP

(57) ABSTRACT

A method and an apparatus for performing carrier switching in a wireless communication system using multi-carriers are provided. According to the method, a Mobile Station (MS) transmits a message including information on a time slot occupying status to a Base Station (BS), if a message for instructing to report the information on the time slot occupying status, is received from the BS, receives, from the BS, first information on at least one time slot scheduled by using the information on the time slot occupying status, identifies at least one time slot using the first information, and performs the carrier switching in the identified at least one time slot.

20 Claims, 9 Drawing Sheets

METHOD AND APPARATUS FOR PERFORMING CARRIER SWITCHING IN A WIRELESS COMMUNICATION SYSTEM USING MULTI-CARRIERS

PRIORITY

This application claims the benefit under 35 U.S.C. §119 (a) of a Chinese patent application filed in the Chinese Patent Office on Aug. 11, 2010 and assigned Serial No. 201010257791.8, the entire disclosure of which is hereby incorporated by reference.

BACKGROUND OF THE INVENTION

1. Field of the Invention:

The present invention relates to network communication techniques. More particularly, the present invention relates to a method and an apparatus for performing carrier switching in a wireless communication system using multi-carriers.

2. Description of Related Art:

"Wireless+broadband" has become a trend of network development, and various wireless communication systems are competing with each other in the field of broadband wireless access. World interoperability for Microwave Access Forum (WiMAX) is a desired broadband wireless accessing system. WiMAX is being mass tested and has been put to commercial use in countries including various European countries, America, Japan and South Korea. WiMAX is characterized by its large geographical coverage, high transmission speed, support of high speed movement, high frequency efficiency, fast deployment, low cost and so on. With pre-commercial use and commercial use of WiMAX becoming popular, WiMAX will have good development prospects.

When mobile stream media services are deployed in the future, larger amounts of traffic may be received by a Mobile Station (MS) for multicast services than for unicast services. To meet the demands for stream media services of a future market, an Enhanced Multicast Broadcast Service (E-MBS), which is similar to a Multimedia Broadcast Multicast Service (MBMS) provided by the $3^{rd}$ Generation Partnership Project (3GPP) and Broadcast Multicast Service (BCMCS) provided by 3GPP2, is provided by the family of Institute of Electrical and Electronics Engineers (IEEE) 802.16 standards to support multimedia broadcast and multicast.

In addition, future services may occupy more and more bandwidth due to the increasing demand of users, and thus multi-carrier techniques are brought forward to deal with problems regarding downward compatibility, cost of a terminal, spectral efficiency and so on. Multi-carrier techniques refer to a technique which combines several carriers whose bandwidth is relatively narrow to serve one MS. The multi-carrier technique utilizes a transmitting end that should be able to transmit information to a receiving end simultaneously over multiple carriers, and utilizes a receiving end that should be able to receive information simultaneously from multiple carriers. However, it usually happens that an MS on a receiving end cannot work on multiple carriers simultaneously. Therefore the MS will have to work on at least two carriers by employing time division multiplexing. Accordingly, information transmitted by the transmitting end should not overlap with each other in the time domain. Further, sufficient time should be reserved for the receiving end to perform carrier switching and synchronization and so on, so that the receiving end can receive the information successfully. Likewise, if the transmitting end cannot work on multiple carriers simultaneously, information transmitted by the transmitting end will not overlap with each other in the time domain, and the transmitting end needs sufficient time for performing carrier switching, synchronization and transmission.

According to the current IEEE 802.16m specification, an MS receives and/or transmits information over a primary carrier, including receiving carrier switching scheduling information transmitted by a Base Station (BS). The carrier switching scheduling information includes information of at least one time slot for carrier switching. The MS then performs carrier switching according to the information of the at least one time slot, i.e., switching to a target carrier in the at least one specified time slot to receive and/or transmit information.

If the MS can only process information on one carrier at a time, when the MS needs to transmit or receive information on two or more carriers, the BS may be unable to perform the scheduling. For example, an MS has subscribed to many E-MBS services, and is receiving the E-MBS services on carrier B. If the BS is to transmit other data to the MS via carrier X, the BS has to inform the MS to switch from carrier B to carrier X in a specified time slot. In the related art, in order to support sleep mode of users and to reduce costs, the BS usually has no knowledge about which E-MBS services are being received by the MS and only has knowledge about which E-MBS services are subscribed to by the MS. Thus, the BS may regard time slots corresponding to the E-MBS services subscribed to by the MS as all unavailable for carrier switching. If the MS has subscribed to many E-MBS services, the BS may be unable to perform the carrier switching scheduling, and thus cannot transmit the needed service or data on carrier X as needed. But in fact, among the time slots corresponding to the E-MBS services subscribed to by the MS, time slots corresponding to E-MBS services which are not being received by the MS are not occupied and can be used for carrier switching.

To address the above problem, a related art solution is: in multi-carrier techniques, an MS reports a list of identities of E-MBS services being received by the MS, i.e., a list of identities and flow identities of all E-MBS services; when performing Dynamic Service Addition (DSA), the BS determines idle time slots as the time slots for carrier switching based on the list received, and includes information of the time slots in carrier switching scheduling information, and sends the carrier switching scheduling information to the MS; the MS performs carrier switching in the time slots according to the carrier switching scheduling information.

Although the above solution enables the BS to perform carrier switching scheduling for the MS, the MS is required to report the list of identities of all E-MBS services being received by the MS, and each time when there is a change in the E-MBS services being received, the MS shall report the list of identities or report information of the change, thus the signaling overhead is large. Further, the MS has to wait for a response from the BS after each report, which increases the data transmission delay and may not meet data transmission requirements of real time services in the worst situations. Therefore, when costs and complexity are taken into consideration, the above solution should be a last choice when there are other candidate solutions despite the above solution being a workable solution.

SUMMARY OF THE INVENTION

Aspects of the present invention are to address at least the above-mentioned problems and/or disadvantages and to provide at least the advantages described below. Accordingly, an aspect of the present invention is to provide a method for performing carrier switching in multi-carrier techniques, so that signaling overhead in the carrier switching process can be reduced.

In accordance with an aspect of the present invention, a method for performing carrier switching by a Mobile Station (MS) in a wireless communication system using multi-carriers is provided. The method includes transmitting a message including information on a time slot occupying status to a Base Station (BS), if a message for instructing to report the information on the time slot occupying status, is received from the BS, receiving, from the BS, first information on at least one time slot scheduled by using the information on the time slot occupying status, identifying at least one time slot using the first information, and performing the carrier switching in the identified at least one time slot.

In accordance with an aspect of the present invention, a method for performing carrier switching scheduling by a BS in a wireless communication system using multi-carriers is provided. The method includes transmitting, to a MS, a message for instructing to report information on a time slot occupying status, if a message including the information on time slot occupying status is received from the MS, determining first time slots to be used for the carrier switching scheduling using the information on time slot occupying status, performing the carrier switching scheduling using the determined first time slots, and transmitting, to the MS, information on at least one time slot according to a result of the carrier switching scheduling.

In accordance with an aspect of the present invention, an apparatus for performing carrier switching of a MS in a wireless communication system using multi-carriers is provided. The apparatus includes a transmitter for transmitting a message including information on a time slot occupying status to a BS, if a message, for instructing to report the information on the time slot occupying status, is received from the BS, a receiver for receiving, from the BS, first information on at least one time slot scheduled by using the information on the time slot occupying status, and a controller for identifying at least one time slot using the first information, and for performing the carrier switching in the identified at least one time slot.

In accordance with an aspect of the present invention, an apparatus for performing carrier switching scheduling of a BS in a wireless communication system using multi-carriers is provided. The apparatus includes a transmitter for transmitting, to a MS, a message for instructing to report information on a time slot occupying status, a controller for, if a message including the information on time slot occupying status is received from the MS, determining first time slots to be used for the carrier switching scheduling using the information on time slot occupying status, for performing the carrier switching scheduling using the determined first time slots, and for controlling the transmitter for transmitting, to the MS, information on at least one time slot according to a result of the carrier switching scheduling.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
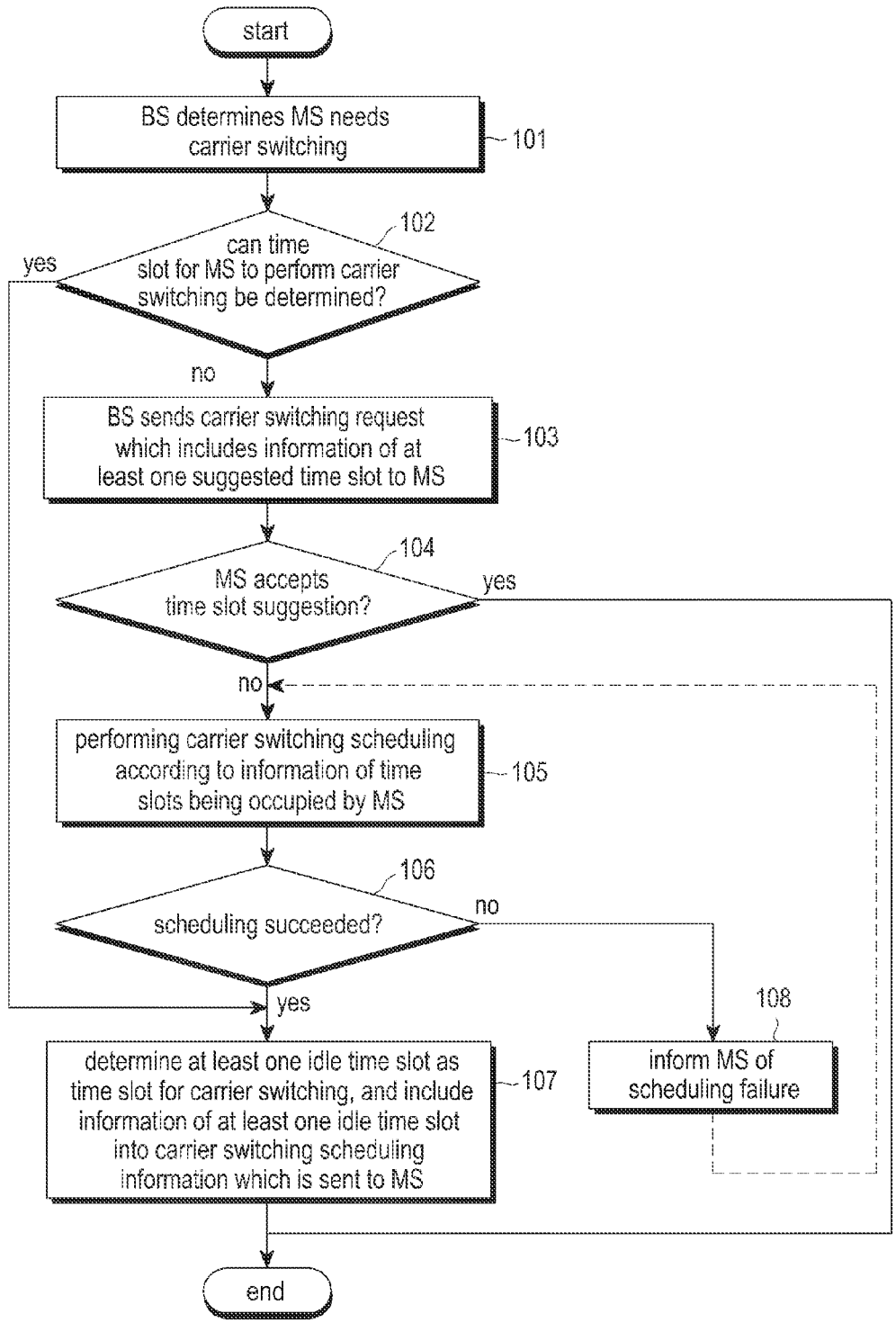
FIG. 1 is a flowchart illustrating a process performed by a Base Station (BS) according to an exemplary embodiment of the present invention.

FIG. 1 is a flowchart illustrating a process performed by a Base Station (BS) according to an exemplary embodiment of the present invention.

Referring to FIG. 1, a Base Station (BS) determines that a Mobile Station (MS) needs carrier switching in step 101. In step 102, the BS determines whether a time slot for carrier switching for the MS can be determined, i.e., the BS cannot determine which time slot of the MS is idle. If the BS can determine a time slot for carrier switching for the MS, i.e., the BS can determine which time slot of the MS is idle, the process proceeds to step 107. In contrast, if the BS cannot determine a time slot for carrier switching for the MS, i.e., the BS cannot determine which time slot of the MS is idle, the BS sends a carrier switching request to the MS which includes information of at least one suggested time slot.

In step 104, the BS determines if the MS accepts the at least one suggested time slot included in the carrier switching request. The BS determines in step 104 that the MS accepts the at least one suggested time slot when the MS determines that the at least one time slot identified by the information of the at least one suggested time slot can be used for carrier switching, and the MS responds to the BS with a carrier switching response indicating that the information of the at least one suggested time slot is acceptable. In this case the process for the BS ends and the MS may perform carrier switching in the at least one time slot identified by the information of the at least one suggested time slot.

In contrast, the BS determines in step 104 that the MS does not accept the at least one suggested time slot when the MS determines that the at least one time slot identified by the information cannot be used for carrier switching, e.g., the at least one time slot has been occupied, and the MS responds to the BS with a carrier switching response indicating that the information of the at least one suggested time slot is not acceptable. Further, the MS may report information of at least one time slot being occupied by the MS, e.g., report a list of identities of one or more E-MBS services being received by the MS, in a manner adopted by the related art. In step 105, the BS performs carrier switching scheduling according to the received information of the at least one time slot being occupied by the MS. In step 106, the BS determines if scheduling is successfully performed. If the scheduling is successfully performed in step 106, at least one idle time slot can be determined as the time slot for carrier switching in step 107. In step 107, the BS may include information of the at least one time slot for carrier switching into the carrier switching scheduling information and transmit the carrier switching scheduling information to the MS. Then the MS performs carrier switching in the at least one time slot identified by the information. The above process corresponds to steps 104-107 of FIG. 1.

If the carrier switching scheduling performed by the BS is unsuccessful at step 106, i.e., the BS fails to determine an idle time slot, the BS notifies the MS that the carrier switching scheduling has failed in step 108. Here, the process may return to step 105. After receiving the notification, the MS gives up at least one of the services being received or to be received. The at least one service given up may be a service on the carrier, e.g., an Enhanced Multicast Broadcast Service (E-MBS) service, or may be a service on another carrier, or may be an E-MBS service or a service on another carrier which is to be received, e.g., a new call/incoming call/service connection which was to be established on another carrier, e.g., carrier X. After that, the MS may report to the BS the at least one service which is to be received and is given up so that the BS may carry out another determination procedure to determine whether the MS needs carrier switching; or the MS may report to the BS information of time slots being occupied by the MS so that the BS may perform carrier switching scheduling based on the information of time slots being occupied by the MS.

If the BS determines that the MS needs carrier switching and can directly determine a time slot for the MS to perform carrier switching, the BS includes information of the at least one idle time slot into carrier switching scheduling information and transmits the carrier switching scheduling information to the MS, and the MS performs carrier switching in the at least one time slot identified by the information of the at least one idle time slot. The above process corresponds to steps 101, 102 and 107 of FIG. 1. In addition, when the BS transmits the information of the at least one time slot determined for carrier switching to the MS, the BS may also include an indication indicating that the MS is to report information of time slots being occupied by the MS into the information transmitted. Besides responding to the BS with a carrier switching response indicating that the information of the at least one suggested time slot is acceptable or indicating that the MS has stopped receiving all E-MBS services, the MS may further report information of time slots being occupied by the MS to the BS. Furthermore, after receiving the carrier switching scheduling information transmitted by the BS, if the MS determines to stop receiving all services from the current carrier, the MS transmits a carrier switching response to the BS indicating that the MS is to stop receiving all services from the current carrier, switches to and anchors to a target carrier or performs carrier switching according to information of the at least one time slot determined by the BS for carrier switching.

After receiving the carrier switching response indicating that the MS is to stop receiving all services from the current carrier, the BS may select at least one arbitrary time slot to perform scheduling for the MS.

The flowchart of the process performed on the BS side according to the above method provided by an exemplary embodiment of the present invention is shown in FIG. 1.

In most cases, the number of E-MBS services being received by an MS is much smaller than the number of all E-MBS services subscribed to by the MS, thus there is a high probability of the MS accepting the time slot suggestion sent by the BS, i.e., the time slot suggested by the BS is very likely to be idle. That is, by adopting the above method of an exemplary embodiment of the present invention, the negotiation between a BS and an MS for the time slot for carrier switching in most cases can be done through only one signaling interaction, i.e., the BS sends a time slot suggestion to the MS, as long as the MS can accept the at least one time slot suggested by the BS, the MS will not have to report information of time slots being occupied, e.g., reporting a list of identities of one or more E-MBS services being received by the MS, which not only reduced signaling overhead but also reduces time delay.

It should be noted that the carrier switching involved in an exemplary embodiment of the present invention can be applied to an MS which can work on two carriers, as well as to an MS which can work on more than two carriers. When the method is applied to an MS which can work on more than two carriers, the BS may further transmit information of a target carrier of the carrier switching to the MS together with the information of the at least one suggested time slot or the information of the at least one time slot for carrier switching.

To make the above method more readily understood, the above method will be described in detail by referring to a few exemplary embodiments. For facilitating description, the following exemplary embodiments are described in the context of an MS which can work on two carriers as an example, i.e., the carrier switching is performed between the two carriers.

First Exemplary Embodiment

Figure 2:
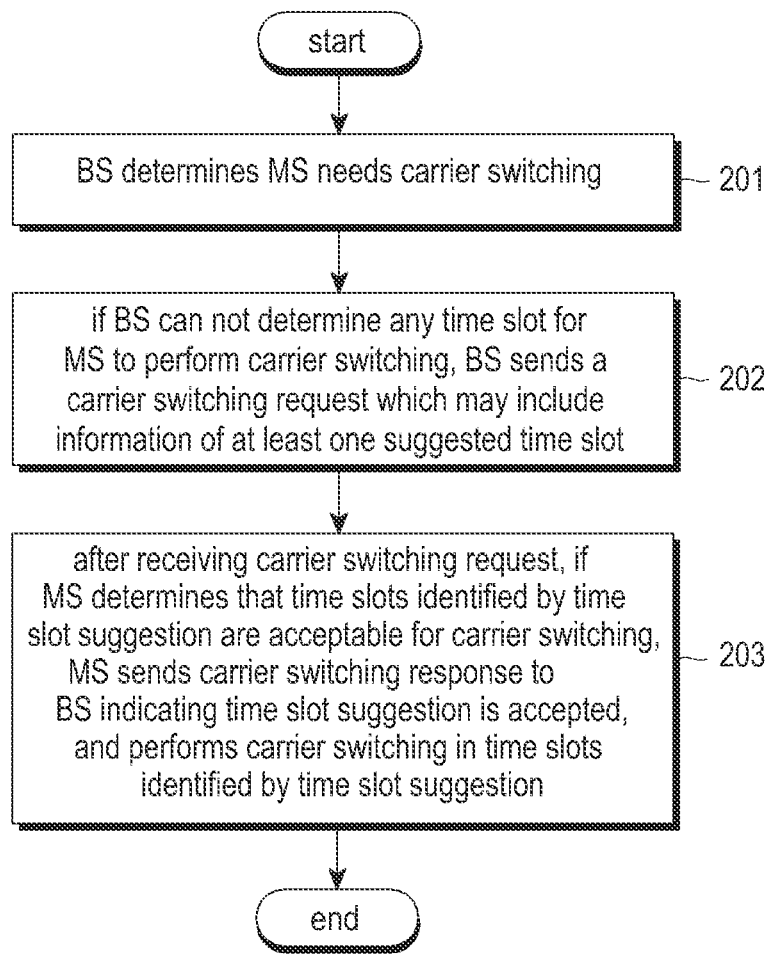
FIG. 2 is a flowchart in accordance with a first exemplary embodiment of the present invention.

FIG. 2 is a flowchart in accordance with a first exemplary embodiment of the present invention. Referring to FIG. 2, the method may include the following steps.

In step 201, a BS determines an MS needs to perform carrier switching.

In step 202, if the BS cannot determine a time slot for the MS to perform carrier switching, the BS transmits a carrier switching request to the MS, and the carrier switching request includes information of at least one suggested time slot (e.g., a Unicast Available Interval (UAI) suggestion).

Taking E-MBS services as an example, if the MS does not subscribe to many E-MBS services, the BS determines that there exists at least one idle time slot among time slots which are not occupied by the E-MBS services subscribed to by the MS and the at least one idle time slot can meet the service requirement, performs scheduling, and directly selects the at least one idle time slot as the time slot for carrier switching. If the MS subscribes to many E-MBS services, the BS determines that there does not exist any idle time slot which is not occupied by the E-MBS services subscribed to by the MS or determines there exists at least one idle time slot but the at least one idle time slot cannot be scheduled to meet the service requirements, and thus cannot determine a time slot for the MS to perform carrier switching.

The information of the at least one suggested time slot can be carried by a carrier switching request, an exemplary format of which is shown below in Table 1 or Table 2. The following exemplary embodiments adopt the same format, and thus will not be described further.

TABLE 1

| mandatory or optional | Attributes | size (bits) | content of attributes | conditions |
| --- | --- | --- | --- | --- |
| mandatory | Action code | 2 | 0b00: requires the MS to send a list of E-MBS services being received, i.e., an E-MBS receiving list<br>0b01: time slot suggestion<br>0b10: time slot suggestion, and the MS is required to send an E-MBS receiving list<br>0b11: time slot allocation command for carrier switching | |
| mandatory | UAI suggestion type | 2 | 0b00: UAI suggestion includes detailed information of at least one time slot<br>0b01: UAI suggestion includes information of at least one E-MBS IDentifier (ID) and at least one flow ID<br>0b10: UAI suggestion includes detailed information of at least one time slot, at least one E-MBS ID and at least one flow ID<br>0b11: reserved | |
| optional | time slot dividing type/mode | 2 | when the same E-MBS Scheduling Interval/Period (MSI) is adopted, different time slot dividing manners may be adopted. For example:<br>0b00: the MSI is divided into four equal parts<br>0b01: the MSI is divided into eight equal parts<br>0b10: the MSI is divided by super-frame, i.e. the granularity of the time slots is a super-frame.<br>0b11: the MSI is divided into unequal parts.<br>Other time slot dividing types/modes can be identified by different values here. | this attribute shall be included when the UAI suggestion type is 00 or 10 |
| optional | E-MBS Zone ID | 7 | including E-MBS service connections not being received by the MS | this attribute shall be included when the action code is 01 or 10 and the UAI suggestion type is 01 or 10 |
| optional | Num_E-MBS_Connections | 4 | the number of E-MBS service connections not being received by the MS | this attribute shall be included when the action code is |

TABLE 1-continued

| mandatory or optional | Attributes | size (bits) | content of attributes | conditions |
|---|---|---|---|---|
| | | | | 01 or 10 and the UAI suggestion type is 01 or 10 |
| optional | E-MBS IDs and Flow IDs (FIDs) | variable | E-MBS service connections not being received by the MS (identified by E-MBS IDs and FIDs), occupies 16 * n bits | this attribute shall be included when the action code is 01 or 10 and the UAI suggestion type is 01 or 10 |
| optional | Carrier Switching Start Time | 4 | the last four bits of the super-frame ID of a super-frame in which the carrier switching is performed | this attribute shall be included when the action code is 01 or 10 or 11 |
| optional | Number of Unicast Available Intervals | 2 | the number of UAI within an MSI (default value is 1) | this attribute shall be included when the action code is 01 or 10 or 11 and the UAI suggestion type is 00 or 10 |
| optional | Unicast Available Interval Start | variable | in unit of frames, dual-frames or super-frames where n is the number of UAIs; the size of this attribute increases with the increasing of the length of MSI. The MS stays at primary carrier from UAI Start to UAI End. | this attribute shall be included when the action code is 01 or 10 or 11, and the UAI suggestion type is 00 or 10 |
| optional | UAI End | variable | in unit of frames, dual-frames or super-frames where n is the number of UAIs; the size of this attribute increases with the increasing of the length of MSI. The MS stays at primary carrier from UAI Start to UAI End. | this attribute shall be included when the action code is 01 or 10 or 11 and the UAI suggestion type is 00 or 10 |

TABLE 2

| mandatory or optional | attributes | size (bits) | content of the attributes | conditions |
|---|---|---|---|---|
| mandatory | Action code | 2 | 0b00: requires the MS to send an E-MBS receiving list 0b01: time slot suggestion 0b10: time slot suggestion, the MS is required to send an E-MBS receiving list 0b11: time slot allocation command for carrier switching | |
| mandatory | UAI suggestion type | 2 | 0b00: UAI suggestion includes detailed information of at least one time slot 0b01: UAI suggestion includes information of at least one E-MBS ID and at least one flow ID 0b10: UAI suggestion includes detailed information of at least one time slot, information of at least one E-MBS ID and information of at least | |

TABLE 2-continued

| mandatory or optional | attributes | size (bits) | content of the attributes | conditions |
|---|---|---|---|---|
| optional | time slot dividing type/mode | 2 | one flow ID 0b11: reserved When the same MSI is adopted, different time slot dividing manners may be adopted. For example, the MSI can be divided into four equal parts, eight equal parts, in unit of super-frames, into unequal parts and so on, and the manners can be identified by different values. | this attribute shall be included when the UAI suggestion type is 00 or 10 |
| Optional | E-MBS Zone ID | 7 | including E-MBS connections not being received by the MS | this attribute shall be included when the action code is 01 or 10 and the UAI suggestion type is 01 or 10 |
| Optional | Num_E-MBS_Connections | 4 | the number of E-MBS connections not being received by the MS | this attribute shall be included when the action code is 01 or 10 and the UAI suggestion type is 01 or 10 |
| Optional | E-MBS IDs and FIDs | variable | E-MBS connections not being received by the MS (identified by E-MBS IDs and FIDs), occupies 16 * n bits | this attribute shall be included when the action code is 01 or 10 and the UAI suggestion type is 01 or 10 |
| Optional | Carrier Switching Start Time | 4 | the last four bits of the super-frame ID of a super-frame in which the carrier switching is performed | this attribute shall be included when the action code is 01 or 10 or 11 |
| Optional | Bitmap (UAI suggestion/command mapping table) | variable | The length is determined by an agreement between the BS and the MS. 0b0: no carrier switching 0b1: carrier switching | this attribute shall be included when the action code is 01 or 10 or 11 and the UAI suggestion type is 00 or 10 |

Figure 3:
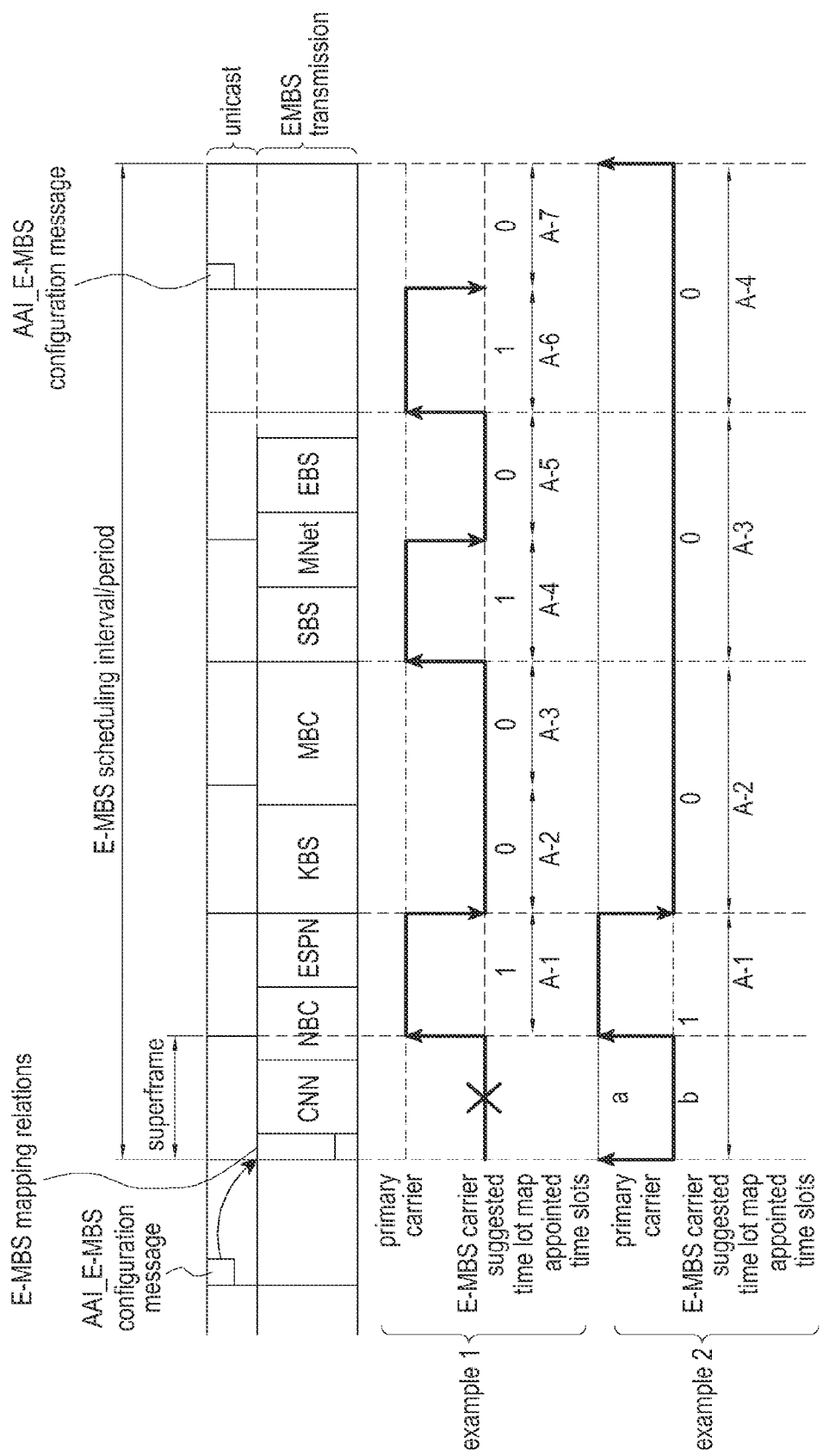
FIG. 3 is a schematic illustrating two allocations of time slots in a Bitmap mapping table according to an exemplary embodiment of the present invention.

FIG. 3 is a schematic illustrating two allocations of time slots in a Bitmap mapping table according to an exemplary embodiment of the present invention.

In the above Table 1 or Table 2, when an MSI is divided into time slots, in the first frame/super-frame of an E-MBS scheduling interval (MSI), the MS has to read the E-MBS mapping relations as shown in FIG. 3. and thus the MS will not have time to switch to another carrier to read information in the head of a synchronized super-frame in the carrier after reading the E-MBS mapping relations.

In the above situation, the time slot corresponding to the first frame/super-frame cannot be taken as the time slot available for carrier switching, i.e., in this time slot the terminal has to read E-MBS mapping relations from the E-MBS carrier.

Regarding the above time slot dividing type/mode, when the carrier switching is for a real time service, such as Voice over Internet Protocol (IP) (VoIP), video telephony and so on, the BS tends to choose time slots with smaller granularity to meet the service requirements for smaller delay and smaller jitter, e.g., the candidate time slot can be in a unit of super-frames defined in the Institute of Electrical and Electronics Engineers (IEEE) 802.16m standard, and each super-frame lasts 20 ms. Information in a super-frame header should be read before information in the super-frame can be read, and a granularity smaller than a super-frame may bring other problems, so it is more efficient to take a super-frame as the granularity. But an MSI includes only two super-frames, i.e., eight frames, according to the IEEE 802.16m standard. When the time slot is in unit of super-frames, the number of candidate time slots is small, i.e., 2, so the granularity should be reduced to provide more candidate time slots. Therefore, when an MSI only includes two super-frames, the candidate time slots can be in a unit of dual-frames.

For non real time services which have low requirements for delay and so on, system overhead and complexity are the main factors taken into consideration, so the BS tends to choose a larger granularity for scheduling. For example, the IEEE 802.16m standard divides an MSI into four equal parts. Therefore, the BS may negotiate a time slot dividing policy with the MS via the attribute of time slot dividing type/mode in the carrier switching request based on service requirements, Quality of Service (QoS) and so on. For the manner of dividing an MSI into unequal intervals, the BS may inform the MS of the detailed dividing manner via a Media Access Control (MAC) management message. This dividing manner is generally obtained according to specific situation of service resource allocation, e.g., when a time slot needs to include several E-MBS services.

The larger the granularity adopted by the time slot dividing type/mode is, the fewer the candidate time slots will be, and the smaller the amount of overhead in the signaling transmission there will be. In addition, since a candidate time slot with a larger granularity may include more E-MBS services, when there is a change in the E-MBS services being received by the MS and the change does not affect the carrier switching time slot, the MS will not have to report the change, thus the signaling overhead can be reduced. For example, the MS changes an E-MBS service being received, and the service is not in the carrier switching time slot; resources occupied by an E-MBS service being received are increased, but the service is still not in the carrier switching time slot.

When the BS provides a time slot suggestion, according to the above time slot dividing type/mode, the BS may choose a super-frame or ¼ of the length of an E-MBS scheduling period, i.e., two preferred candidate time slots mentioned above, as the granularity of the suggested time slot.

In this exemplary embodiment, the action code in the carrier switching request can be 0b01, indicating the carrier switching request carries information of at least one suggested time slot. The information of the at least one suggested time slot may be in the following three forms.

According to form 1, the information of a suggested time slot is detailed information of the at least one time slot. This form of information may further be indicated in two manners. The first manner indicates the at least one time slot by utilizing attributes of a Number of Unicast Available Intervals, a UAI Start and a UAI End as shown in Table 1. The second manner indicates the at least one time slot by utilizing the attribute of a Bitmap as shown in Table 2. The BS may inform the MS of the at least one suggested time slot by indicating in the Bitmap whether each time slot is a suggested time slot, e.g., by setting the value at a position in the Bitmap corresponding to the suggested time slot as 1, and setting the value at other positions as 0. FIG. 3 is an exemplary embodiment of the Bitmap.

The above form 1 is a direct indicating manner.

According to form 2, the information of the at least one suggested time slot is information of at least one service identity, e.g., utilizing at least one E-MBS ID and at least one FID as shown in Table 1 and Table 2. The above form 2 is an indirect indicating manner, e.g., utilizing the E-MBS ID of at least one E-MBS service subscribed to by the MS to indicate the at least one time slot corresponding to the E-MBS service is the at least one suggested time slot.

According to form 3, the information of the at least one suggested time slot is a combination of the above two forms of information.

According to an exemplary embodiment of the present invention, a system may not be required to support all of the above three forms of information, e.g., the system may adopt a plurality of bits for representing the UAI suggestion type. The system may also select to support one or some of the above three forms to make the system simplified. Likewise, the system may select to support one or some of the E-MBS list types.

Also, the system of an exemplary embodiment of the present invention may not necessarily support all the time slot dividing type/modes, and may select to support one or some of the time slot dividing type/modes. The above system can be modified as long as the two communicating parties can reach an agreement on the time slot for carrier switching required for implementing the carrier switching.

In step 203, after the MS receives the carrier switching request, if the at least one time slot identified by the information of the at least one suggested time slot can be used for carrier switching, the MS sends a carrier switching response to the BS indicating that the information of the at least one suggested time slot is accepted. The MS performs carrier switching in the at least one time slot identified by the information of the at least one suggested time slot.

An exemplary format of the carrier switching response is shown below in Table 3.

TABLE 3

| Mandatory or Optional | Attributes | size (bits) | content of the attributes | conditions |
|---|---|---|---|---|
| mandatory | Action code | 2 | 0b00: the MS is required to send an E-MBS receiving list<br>0b01: the MS accepts the time slot suggestion or the time slot allocation command<br>0b10: the MS accepts the time slot suggestion or the time slot allocation command, and sends an E-MBS receiving list<br>0b11: the MS stops receiving all E-MBS services | |
| optional | E-MBS Zone ID | 7 | E-MBS Zone ID, E-MBS connections | this attribute shall be |

TABLE 3-continued

| Mandatory or Optional | Attributes | size (bits) | content of the attributes | conditions |
|---|---|---|---|---|
| | | | within the zone being received by the MS | included when the action code is 00 or 10 |
| optional | Num_E-MBS_Connections | 4 | the number of E-MBS connections being received by the MS | this attribute shall be included when the action code is 00 or 10 |
| optional | E-MBS IDs and FIDs | variable | E-MBS connections being received by the MS (identified by E-MBS IDs and FIDs), occupies 16 * n bits | this attribute shall be included when the action code is 00 or 10 |

In this exemplary embodiment, the action code in the carrier switching response can be 0b01, indicating the MS will adopt the information of the at least one suggested time slot for carrier switching.

Second Exemplary Embodiment

Figure 4:
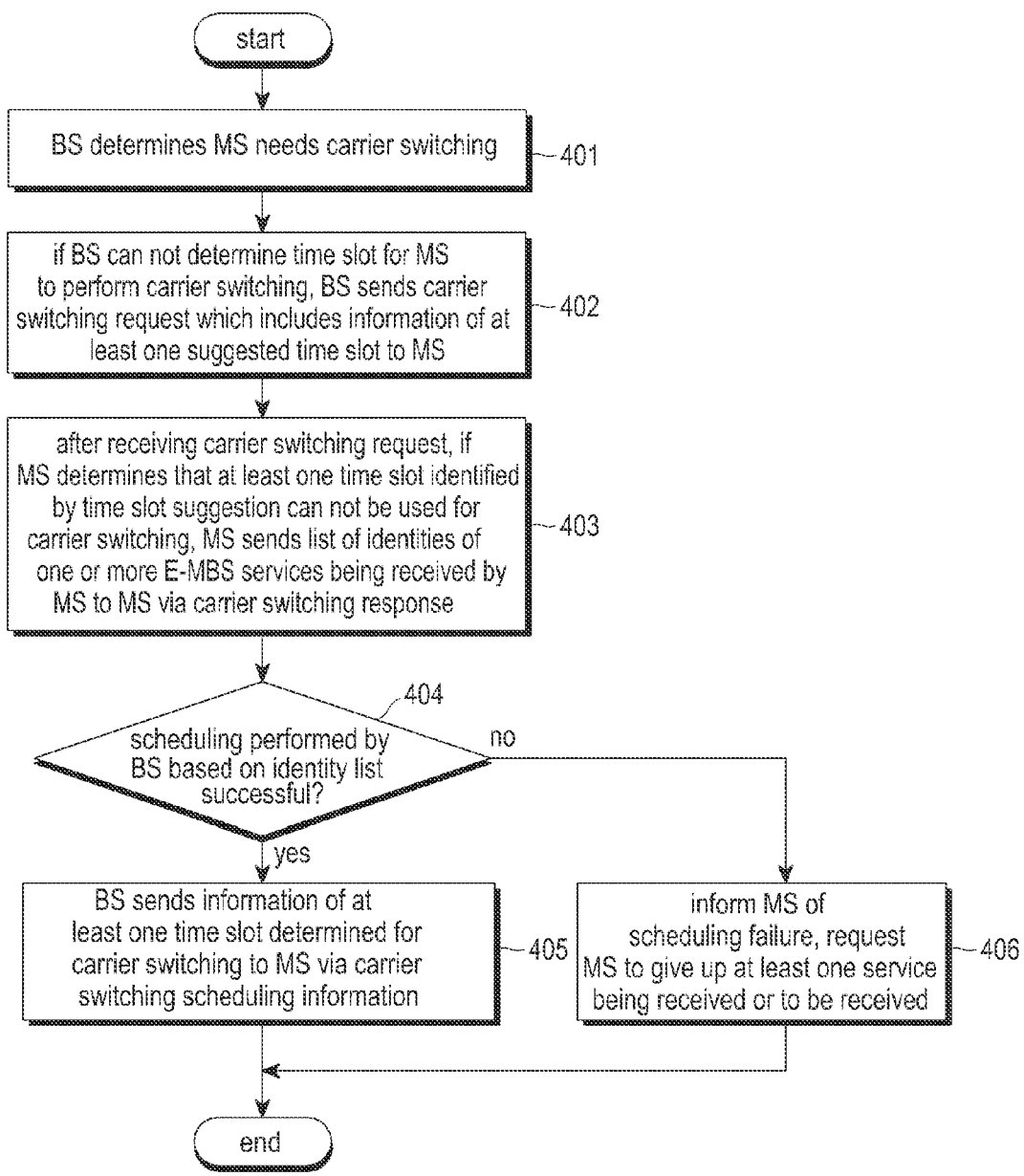
FIG. 4 is a flowchart in accordance with a second exemplary embodiment of the present invention.

FIG. 4 is a flowchart in accordance with a second exemplary embodiment of the present invention. Referring to FIG. 4, the method may include the following steps.

Steps 401 to 402 are substantially identical with steps 201 to 202 of FIG. 2 and thus a description thereof will be omitted herein.

In step 403, after receiving the carrier switching request, if the at least one time slot identified by the information of the at least one suggested time slot cannot be used for carrier switching, the MS sends information of at least one time slots being occupied by the MS to the BS via a carrier switching response.

In this exemplary embodiment, the MS may send a list of identities of one or more E-MBS services being received to the BS via the carrier switching response.

The action code of the carrier switching response may be 0b00, the E-MBS list type may be 0b01, indicating the carrier switching response includes a list of identities of one or more E-MBS services being received by the MS.

An example of a format of the carrier switching response is shown below in Table 4 and Table 5.

Referring to Table 4 and Table 5, the E-MBS receiving list of the MS may be in the following three forms.

According to form 1, the information of the at least one E-MBS service includes information of at least one time slot occupied by the at least one E-MBS service being received. This form of information may further be indicated in two manners. According to the first manner, the information of the at least one E-MBS service is indicated by the E-MBS Zone ID, the number of E-MBS connections, start and end of at least one time slot occupied by the at least one E-MBS service being received as shown in Table 4. In this case, the value of the E-MBS receiving list type may set to be 0b00. According to the second manner, the information is in the form of a time slot occupying status mapping table as shown in Table 5. In this case, the value of the E-MBS receiving list type is set to be 0b00, detailed information of the time slot occupying status mapping table may be indicated by the time slot occupying status mapping table.

TABLE 4

| Mandatory or Optional | Attributes | size (bits) | content of the attributes | conditions |
|---|---|---|---|---|
| mandatory | Action code | 2 | 0b00: the MS sends an E-MBS receiving list<br>0b01: the MS accepts the time slot suggestion or the time slot allocation command<br>0b10: the MS accepts the time slot suggestion or the time slot allocation command, and sends an E-MBS receiving list<br>0b11: the MS stops receiving all E-MBS services | |
| mandatory | E-MBS receiving list type | 2 | 0b00: the E-MBS receiving list includes information of at least one time slot<br>0b01: the E-MBS receiving list includes information of at | |

TABLE 4-continued

| Mandatory or Optional | Attributes | size (bits) | content of the attributes | conditions |
|---|---|---|---|---|
| | | | least one E-MBS ID and at least one FID. 0b10: the E-MBS receiving list includes information of at least one time slot, information of at least one E-MBS ID and information of at least one FID. 0b11: reserved | |
| optional | E-MBS Zone ID | 7 | E-MBS Zone ID, E-MBS connections within the zone being received by the MS | this attribute shall be included when the action code is 00 or 10 and the UAI suggestion type is 01 or 10 |
| optional | Num_E-MBS_Connections | 4 | the number of E-MBS connections being received by the MS | this attribute shall be included when the action code is 00 or 10 and the UAI suggestion type is 01 or 10 |
| optional | E-MBS IDs and FIDs | variable | E-MBS connections being received by the MS (identified by E-MBS IDs and FIDs), occupies 16 * n bits | this attribute shall be included when the action code is 00 or 10 and the UAI suggestion type is 01 or 10 |
| optional | Number of Unicast Available Intervals | 3 | the number of UAIs within one MSI (default value is 1) | this attribute shall be included when the action code is 00 or 10 and the UAI suggestion type is 00 or 10 |
| optional | start of at least one time slot occupied by the E-MBS service | variable | in unit of frames, dual-frames or super-frames; the size of this attribute increases with the increasing of the length of MSI. | this attribute shall be included when the action code is 00 or 10 and the UAI suggestion type is 00 or 10 |
| optional | end of at least one time slot occupied by the E-MBS service | variable | in unit of frames, dual-frames or super-frames; the size of this attribute increases with the increasing of the length of MSI. | this attribute shall be included when the action code is 00 or 10 and the UAI suggestion type is 00 or 10 |

TABLE 5

| Mandatory or Optional | Attributes | size (bits) | content of the attributes | conditions |
|---|---|---|---|---|
| mandatory | Action code | 2 | 0b00: the MS sends an E-MBS receiving list 0b01: the MS accepts the time slot suggestion or the time slot allocation command for carrier | |

TABLE 5-continued

| Mandatory or Optional | Attributes | size (bits) | content of the attributes | conditions |
|---|---|---|---|---|
| mandatory | E-MBS receiving list type | 2 | switching<br>0b10: the MS accepts the time slot suggestion or the time slot allocation command, and sends an E-MBS receiving list<br>0b11: the MS stops receiving all E-MBS services<br>0b00: the E-MBS receiving list includes information of at least one time slot<br>0b01: the E-MBS receiving list includes information of at least one E-MBS ID and at least one FID.<br>0b10: the E-MBS receiving list includes information of at least one time slot, information of at least one E-MBS ID and at least one FID.<br>0b11: reserved | |
| optional | E-MBS Zone ID | 7 | E-MBS Zone ID, E-MBS connections within the zone being received by the MS | this attribute shall be included when the action code is 00 or 10 and the UAI suggestion type is 01 or 10 |
| optional | Num_E-MBS_Connections | 4 | the number of E-MBS connections being received by the MS | this attribute shall be included when the action code is 00 or 10 and the UAI suggestion type is 01 or 10 |
| optional | E-MBS IDs and FIDs | variable | E-MBS connections being received by the MS (identified by E-MBS IDs and FIDs), occupies 16 * n bits | this attribute shall be included when the action code is 00 or 10 and the UAI suggestion type is 01 or 10 |
| optional | time slot occupying status mapping table | variable | the length of this attribute is determined by an agreement between the two parties. 0b0: no carrier switching<br>0b1: carrier switching | this attribute shall be included when the action code is 00 or 10 and the UAI suggestion type is 00 or 10 |

According to form 2, the information is indicated by information of identities of one or more E-MBS services being received. The value of the E-MBS receiving list type may be set to be 0b01, and the detailed information of the identity may be indicated by the MBS Zone ID, the number of E-MBS connections, the E-MBS IDs and FIDs as shown in Table 4 and Table 5.

According to form 3, the information is indicated by a combination of the above two forms of information. In this case, the value of the E-MBS receiving list type may be 0b10.

The BS performs carrier switching scheduling based on the received list of identities and, in step 404, it is determined if the scheduling performed by the BS based on the received list of identities is successful. If the scheduling is successful, the BS includes the information of the at least one time slot determined for carrier switching into the carrier switching scheduling information and sends the carrier switching scheduling information to the MS in step 505 In contrast, if the scheduling has failed, the BS notifies the MS of the failed scheduling and requests the MS to give up at least one service being received or to be received by the MS in step 406. For example, the MS may give up at least one of the E-MBS services being received, or give up at least one of services which are to be established and for which the BS sends the carrier switching request, e.g., the service/connection to be established on carrier X described with respect to the related art. The above mentioned information of at least one time slot for carrier switching sent when the scheduling is successful may be identical with the above time slot suggestion mapping table, i.e., establishing the attribute of a Bitmap in the manner of a mapping table.

Third Exemplary Embodiment

Figure 5:
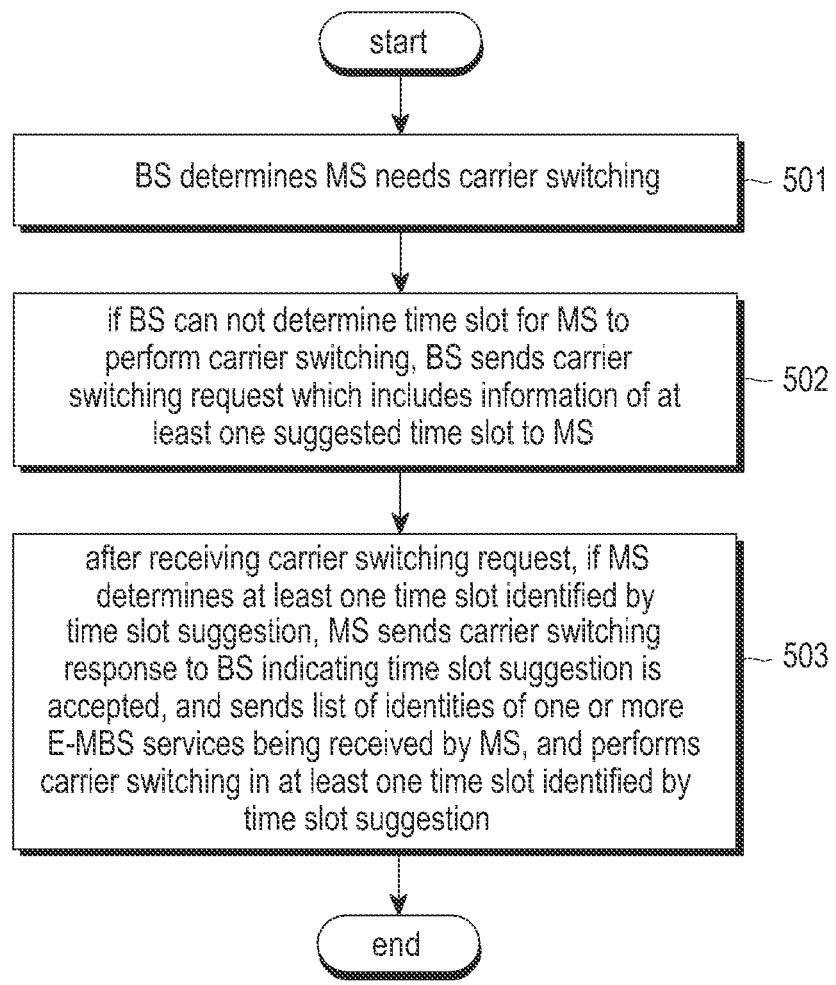
FIG. 5 is a flowchart in accordance with a third exemplary embodiment of the present invention.

FIG. 5 is a flowchart in accordance with a third exemplary embodiment of the present invention. Referring to FIG. 5, the method may include the following steps.

Step 501 is substantially identical with step 201 of FIG. 2 and thus a description thereof will be omitted herein.

In step 502, if the BS cannot determine a time slot for the MS to perform carrier switching, the BS sends a carrier switching request to the MS, and the carrier switching request includes information of at least one suggested time slot.

In this exemplary embodiment, the carrier switching request may include not only the information of the at least one suggested time slot, but also an indication indicating the MS is to send a list of identities of E-MBS services being received by the MS, and the action code of the carrier switching request may be 0b10.

In step 503, after receiving the carrier switching request, if the MS determines the at least one time slot identified by the received time slot suggestion can be used for carrier switching, the MS sends a carrier switching response to the BS indicating the time slot suggestion is accepted, and sends a list of E-MBS services being received by the MS. In addition, the MS performs carrier switching in the at least one time slot identified by the time slot suggestion.

In this exemplary embodiment, the action code in the carrier switching response may be 0b01, i.e., the response includes a list of identities of one or more E-MBS services being received by the MS. The list of the identities of one E-MBS services being received by the MS may alternatively be sent to the BS via a list report. An example of the format of the list report is shown below in Table 6 or Table 7. The format of detailed information carried in the list report is identical with that of the second exemplary embodiment, and will not be described further.

TABLE 6

| Mandatory or Optional | Attributes | size (bits) | content of the attributes | conditions |
|---|---|---|---|---|
| mandatory | Action code | 2 | 0b00: appointed E-MBS connections are subjected to a change<br>0b01: appointed E-MBS connections are subjected to a change, and an E-MBS receiving list is sent<br>0b10: an E-MBS receiving list is sent<br>0b11: the MS stops receiving all E-MBS services | |
| mandatory | E-MBS receiving list type | 2 | 0b00: the E-MBS receiving list includes information of at least one time slot<br>0b01: the E-MBS receiving list includes information of at least one E-MBS ID and at least one FID.<br>0b10: the E-MBS receiving list includes information of at least one time slot, information of at least one E-MBS ID and at least one FID.<br>0b11: reserved | |
| optional | E-MBS Zone ID | 7 | E-MBS Zone ID, E-MBS connections within the zone being received by the MS | this attribute shall be included when the action code is 01 or 10 and the UAI suggestion type is 01 or 10 |
| optional | Num_E-MBS_Connections | 4 | the number of E-MBS connections being received by the MS | this attribute shall be included when the action code is 01 or 10 and the UAI suggestion type is 01 or 10 |
| optional | E-MBS IDs and FIDs | variable | E-MBS connections being received by the MS (identified by E-MBS IDs and FIDs), occupies | this attribute shall be included when the action code is 01 or 10 and the UAI |

TABLE 6-continued

| Mandatory or Optional | Attributes | size (bits) | content of the attributes | conditions |
|---|---|---|---|---|
| | | | 16 * n bits | suggestion type is 01 or 10 |
| optional | Number of Unicast Available Intervals | 3 | the number of UAIs within one MSI (default value is 1) | this attribute shall be included when the action code is 01 or 10 and the UAI suggestion type is 00 or 10 |
| optional | start of at least one time slot occupied by the E-MBS service | variable | in unit of frames, dual-frames or super-frames; the size of this attribute increases with the increasing of the length of MSI. | this attribute shall be included when the action code is 01 or 10 and the UAI suggestion type is 00 or 10 |
| optional | end of at least one time slot occupied by the E-MBS service | variable | in unit of frames, dual-frames or super-frames; the size of this attribute increases with the increasing of the length of MSI. | this attribute shall be included when the action code is 01 or 10 and the UAI suggestion type is 00 or 10 |

TABLE 7

| Mandatory or Optional | Attributes | size (bits) | content of the attributes | conditions |
|---|---|---|---|---|
| mandatory | Action code | 2 | 0b00: appointed E-MBS connections are subjected to a change<br>0b01: appointed E-MBS connections are subjected to a change, and an E-MBS receiving list is sent<br>0b10: an E-MBS receiving list is sent<br>0b11: the MS stops receiving all E-MBS services | |
| mandatory | E-MBS receiving list type | 2 | 0b00: the E-MBS receiving list includes information of at least one time slot<br>0b01: the E-MBS receiving list includes information of at least one E-MBS ID and at least one FID.<br>0b10: the E-MBS receiving list includes information of at least one time slot, information of at least one E-MBS ID and at least one FID.<br>0b11: reserved | |
| optional | E-MBS Zone ID | 7 | E-MBS Zone ID, E-MBS connections within the zone being received by the MS | this attribute shall be included when the action code is 01 or 10 and the UAI suggestion type is 01 or 10 |
| optional | Num_E-MBS_Connections | 4 | the number of E-MBS connections | this attribute shall be included |

TABLE 7-continued

| Mandatory or Optional | Attributes | size (bits) | content of the attributes | conditions |
|---|---|---|---|---|
| | | | being received by the MS | when the action code is 01 or 10 and the UAI suggestion type is 01 or 10 |
| optional | E-MBS IDs and FIDs | variable | E-MBS connections being received by the MS (identified by E-MBS IDs and FIDs), occupies 16 * n bits | this attribute shall be included when the action code is 01 or 10 and the UAI suggestion type is 01 or 10 |
| optional | time slot occupying status mapping table | variable | the length of this attribute is determined by an agreement between the two parties. 0b0: no carrier switching 0b1: carrier switching | this attribute shall be included when the action code is 01 or 10 and the UAI suggestion type is 00 or 10 |

Fourth Exemplary Embodiment

Figure 6:
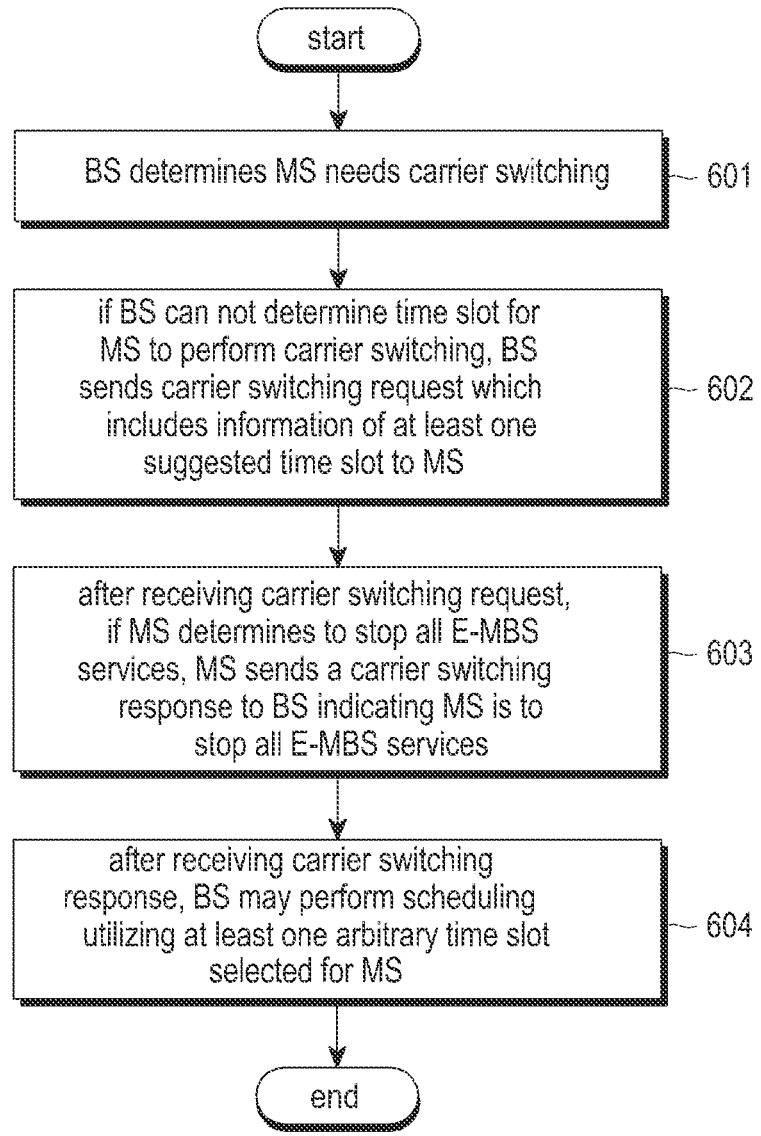
FIG. 6 is a flowchart in accordance with a fourth exemplary embodiment of the present invention.

FIG. 6 is a flowchart in accordance with a fourth exemplary embodiment of the present invention. Referring to FIG. 6, the method may include the following steps.

Steps 601 to 602 are substantially identical with steps 201 to 202 of FIG. 2 and thus a description thereof will be omitted herein.

In step 603, after receiving the carrier switching request, if the MS determines to stop receiving all E-MBS services, the MS sends a carrier switching response to the BS indicating that the MS is to stop receiving all E-MBS services.

When the MS detects that a carrier switching is to be performed, the MS may determine whether to stop receiving a service being received. If the MS determines to stop receiving a service, the MS may inform the BS that the MS is to stop receiving the service. In this exemplary embodiment, the action code in the carrier switching response may be 0b11.

In step 604, after receiving the carrier switching response, the BS may select at least one arbitrary time slot for scheduling for the MS.

Once the MS switches from the carrier on which all services are stopped being received to a target carrier for information receiving and/or sending, the MS may stay at the target carrier until there is a need of another carrier switching.

In addition to the above method, according to an exemplary embodiment of the present invention, at least one time slot may be appointed by the BS and the MS in advance. Once the BS cannot determine at least one time slot for the MS to perform carrier switching, the appointed at least one time slot which is not occupied can be used for carrier switching. Detailed implementation may include the following two manners.

Figure 7:
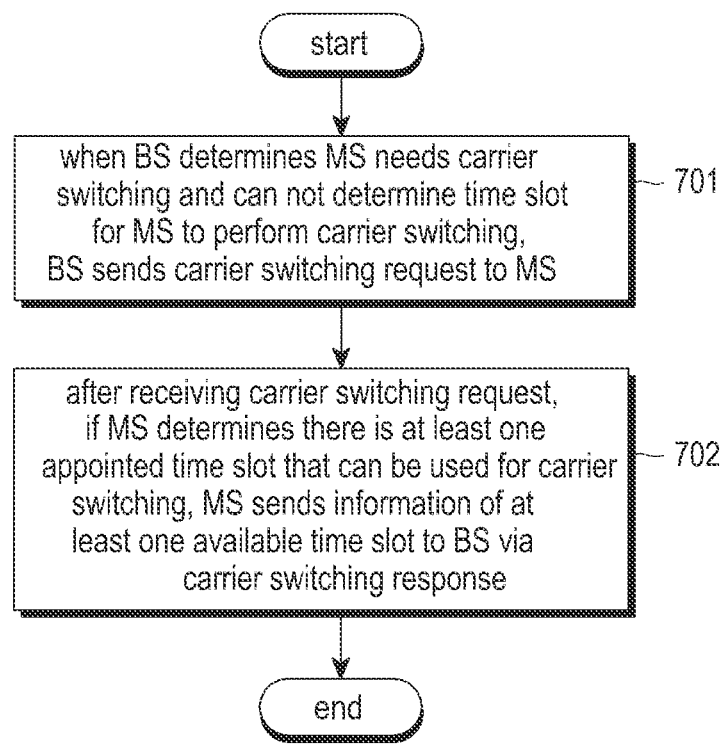
FIG. 7 is a flowchart illustrating a second method according to an exemplary embodiment of the present invention.

Manner 1 may include the following steps as shown in FIG. 7.

FIG. 7 is a flowchart illustrating a second method according to an exemplary embodiment of the present invention.

Referring to FIG. 7, in step 701, a BS sends a carrier switching request to an MS when the BS determines the MS needs carrier switching and cannot determine a time slot for the MS to perform carrier switching.

In step 702, after receiving the carrier switching request, when determining there is at least one time slot among the at least one appointed time slot that can be used for carrier switching, e.g., an unoccupied time slot, the MS takes the at least one time slot as the time slot for carrier switching, and sends information of the at least one time slot determined for carrier switching to the BS via a carrier switching response.

According to this manner, the carrier switching can be implemented through two hand-shake procedures, i.e., after the BS sends a carrier switching request to the MS, once the at least one appointed time slot includes at least one unoccupied time slot, the unoccupied time slot can be used for carrier switching, and then the carrier switching is performed.

This manner is applicable for any situation when there is a candidate time slot, but is more suitable for situations when there are not many candidate time slots for carrier switching. As shown in FIG. 3, in example 2, the MSI is divided into four parts. If the MS is receiving two E-MBS services, i.e., an MBS service and an EBS service, the action code in the carrier switching request may be 0b00 or 0b01, the time slot dividing type/mode may be 0b00, i.e., the MSI is divided into four equal parts. As shown in Table 1, the MS may send in the carrier switching response a time slot occupying status mapping table whose length is appointed to be 4 bits. Thus the MS may send "1000" or "1001" (when the MS does not need to receive the AAI_E-MBS configuration message). The action code of the carrier switching response may be 0b00, and the E-MBS receiving list type may be 0b00. Since the MS does not need to read the AAI_E-MBS message in each E-MBS scheduling interval and the BS may acquire knowledge of the E-MBS scheduling interval whose AAI_E-MBS configuration message will be read by the MS, the MS may not take the AAI_E-MBS configuration message into consideration when reporting the information of time slots being occupied by the MS. Because the BS and the MS both have knowledge of the AAI_E-MBS configuration message, the problem of whether an appointed time slot is available which is introduced by the AAI_E-MBS configuration message can be addressed, i.e., when the MS is reading an AAI_E-MBS configuration message, the BS does not receive information from and/or send information to the MS in the appointed time slot.

Figure 8:
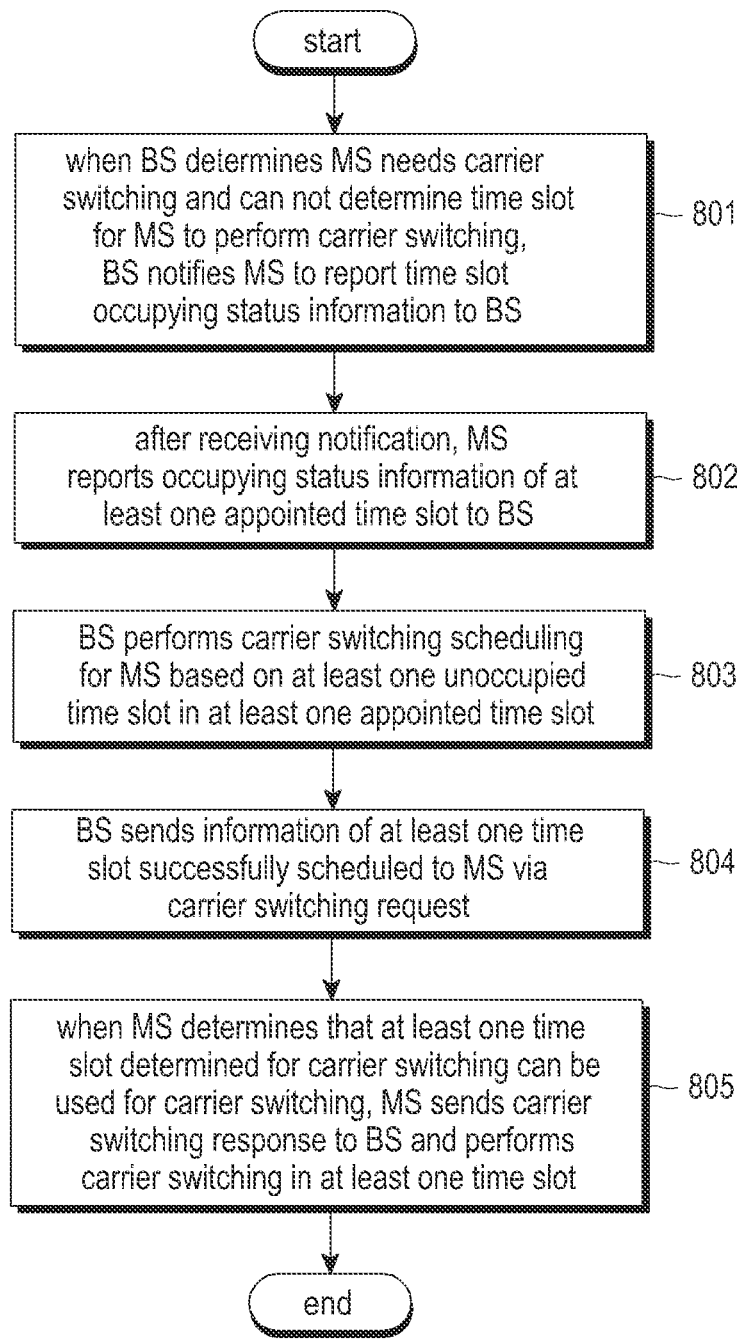
FIG. 8 is a flowchart illustrating a third method according to an exemplary embodiment of the present invention.

Manner 2 may include the following steps as shown in FIG. 8.

FIG. 8 is a flowchart illustrating a third method according to an exemplary embodiment of the present invention.

Referring to FIG. 8, in step 801, a BS notifies an MS to report time slot occupying status information of at least one time slot appointed with the BS when the BS determines the MS needs carrier switching and cannot determine a time slot for the MS to perform carrier switching.

In step 802, after receiving the notification, the MS reports time slot occupying status information of the at least one appointed time slot to the BS.

In step 803, the BS performs carrier switching scheduling utilizing at least one unoccupied time slot in the at least one appointed time slot based on the information.

This manner utilizes three hand-shake procedures to complete the carrier switching, i.e., firstly, the BS notifies the MS to report whether at least one appointed time slot is occupied, then the MS reports the time slot occupying status information of the at least one appointed time slot to the BS. The time slot occupying status information may in any of the three forms in the second exemplary embodiment, and will not be elaborated herein.

The BS performs carrier switching scheduling for the MS utilizing at least one unoccupied time slot in the at least one appointed time slot based on the information, and instructs the MS to perform carrier switching in the at least one determined time slot, i.e., continues to perform step 803.

In step 804, the BS sends information of at least one time slot which is successfully scheduled to the MS via a carrier switching request.

In step 805, when determining that the at least one time slot determined for carrier switching is acceptable, the MS sends a carrier switching response to the BS and performs carrier switching in the at least one time slot identified by the information of the at least one time slot for carrier switching.

This manner is applicable for any situation when there is at least one candidate time slot, but is more suitable for situations when there are many candidate time slots for carrier switching. As shown in FIG. 3, an MSI is divided into eight parts according to super-frames. The first time slot can be omitted from consideration because the E-MBS map will conflict with the super-frame header in the primary carrier. Thus, a whole MSI includes seven candidate time slots for carrier switching.

If the MS is receiving an MBS service and an EBS service, the action code of the carrier switching request may be 0b00 or 0b10, and the time slot dividing type/mode may be 0b10, i.e., an MSI is divided in unit of super-frames as shown in Table 1. The MS may send a time slot occupying status mapping table in the carrier switching response as shown in Table 5. Since the time slot occupying status mapping table occupies seven bits according to an agreement between the BS and the MS, the MS may send "1001010". The action code of the carrier switching response may be 0b00, the E-MBS receiving list type may be 0b00. In the above two manners, similar with the situations in the above described methods, in situations when the carrier switching scheduling has failed and the BS requires the MS to report information of time slots being occupied, and when the MS determines to stop receiving all services being received from the current carrier, the solutions adopted by the above methods can be adopted. The following will describe the solutions respectively.

The BS performs carrier switching scheduling according to information of time slots being occupied by the MS, if the scheduling has failed, the BS notifies the MS of the failed carrier switching scheduling. After receiving the notification, the MS gives up at least one service being received or to be received, and performs the step of reporting information of time slots being occupied by the MS to the BS or the step of reporting the at least one service which is to be received and to be given up by the MS to the BS. Refer to descriptions of the above methods for more details.

When sending the carrier switching request, the BS may also send an indication indicating the MS to report information of time slots being occupied. The MS may not only send the carrier switching response to the BS indicating the information of the at least one suggested time slot that is acceptable or indicating that the MS is to stop receiving all E-MBS services being received, but also reports information of at least one time slot being occupied by the MS to the BS. Refer to descriptions of the above methods for more details.

After receiving the carrier switching request, if the MS determines to stop receiving all services from the current carrier, the MS sends the carrier switching response to the BS indicating that the MS is to stop receiving all services from the current carrier, switches to and stays on a target carrier or performs carrier switching according to information of the at least one time slot determined by the BS for carrier switching. After receiving the carrier switching response indicating that the MS is to stop receiving all services from the current carrier, the BS selects at least one arbitrary time slot for scheduling for the MS. Refer to descriptions of the above methods for more details.

The two methods shown in FIG. 7 and FIG. 8 may also adopt the time slot dividing type/mode described in the first exemplary embodiment. That is, the at least one time slot appointed by the BS and the MS may be based on the above time slot dividing type/mode, i.e., the granularity of the appointed time slot may be a super-frame or ¼ of the length of an E-MBS scheduling interval.

In an exemplary embodiment of the present invention, for any carrier switching method, the MS may send an occupying status of the at least one appointed time slot to the BS when the occupying status of the at least one appointed time slot is changed, so that the BS may adjust the carrier switching scheduling for the MS in real time. For example, when the time slots occupied by E-MBS services are subjected to a change and go beyond an appointed scope due to the scheduling performed by the BS, e.g., the E-MBS services may occupy a time slot for carrier switching of some MS, the BS is required to timely address the problem. For example, the BS notifies a potentially affected MS and/or makes arrangements for the potentially affected MS to report information of time slots being occupied in time, or performs another carrier switching scheduling based on information of whether the at least one appointed time slot is occupied after the change which is reported on the MS's initiative.

When the occupying status of an appointed time slot for carrier switching is changed, no matter whether the change is caused by the BS or by a change within the MS, the MS can detect the change. Accordingly, the MS may report information about whether the at least one appointed time slot is occupied after the change in time, so that the BS is able to update the scheduling in time. For example, E-MBS services received by an MS is changed due to a change in the MS, the new E-MBS services occupy a time slot for carrier switching, the MS should report an occupying status of the appointed time slot after the change in time so that the BS may update the scheduling in time.

When the occupying status of an appointed time slot for carrier switching is changed, if the MS has any other appointed time slots that are available, the BS and the MS may temporarily stop using the changed time slot and use another appointed time slot for communication, including updating the occupying status information.

For example, as shown in FIG. 3, suppose an MS was only receiving an E-MBS service of ESPN, and the time slots appointed by the MS and the BS for carrier switching are super-frames 3-7 after the MS sends "0111110". Now, the E-MBS service of ESPN expands to occupy super-frame 3, so the BS and the MS temporarily stop using super-frame 3 as the time slot for carrier switching and continues to communicate using super-frames 4-7. The MS reports occupying status information of the appointed time slots after the change as early as possible, i.e., by sending "0011110", so that the BS may update the scheduling in time.

Similar to the above example, consider the case where the MS was receiving an E-MBS service of NBC and also sent "0111110", and the time slots appointed by the MS and the BS for carrier switching are super-frames 3-7. Now, the E-MBS service of ESPN expands to occupy super-frame 3, so the BS and the MS temporarily stop using super-frame 3 as the time slot for carrier switching and continues to communicate using super-frames 4-7 because the BS does not know whether the MS is receiving NBC or ESPN. The MS reports occupying status information of the appointed time slots after the change as early as possible, i.e., by sending "0111110", so that the BS may update the scheduling in time.

But when the occupying status of a certain appointed time slot for carrier switching is changed, if the MS does not have any other available appointed time slot, the MS may give up part of the services being received, perform carrier switching in the only appointed time slot for carrier switching, and report an occupying status of the appointed time slot after the change to the BS so that the BS may timely update scheduling.

In addition, when the occupying status of the at least one appointed time slot is changed, the MS may stop all carrier switching in all carrier switching time slots, and re-establish at least one appointed time slot for carrier switching with the BS.

The carrier switching request, the carrier switching response and the list report message referred to herein may be individual MAC management messages, or may be part of certain or some MAC management messages. The message formats shown in Tables 1-7 can also be used directly or by reference in the methods shown in FIG. 7 and FIG. 8.

The technical schemes of exemplary embodiments of the present invention are applicable for both uplinks and downlinks.

Figure 9:
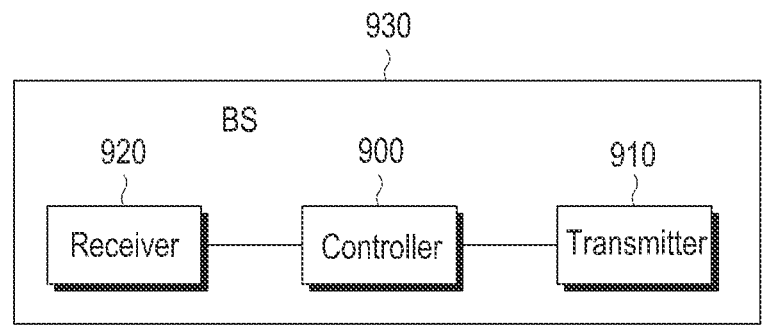
FIG. 9 is a block diagram illustrating a structure of a BS according to an exemplary embodiment of the present invention.

FIG. 9 is a block diagram illustrating a structure of a BS according to an exemplary embodiment of the present invention.

Referring to FIG. 9, the BS 930 includes a controller 900, a transmitter 910 and a receiver 920. The controller 900 controls the transmitter 910 and the receiver 920, and controls operations of the BS 930. And, the BS 930 performs carrier switching scheduling according to exemplary embodiments of the present invention, as shown the FIGS. 1-8.

The transmitter 910 and the receiver 920 perform communication with the MS according to the control of the controller 900. Specifically, the transmitter 910 performs a message transmission operation according to carrier switching scheduling, and the receiver 920 performs message reception operation according to carrier switching scheduling.

Figure 10:
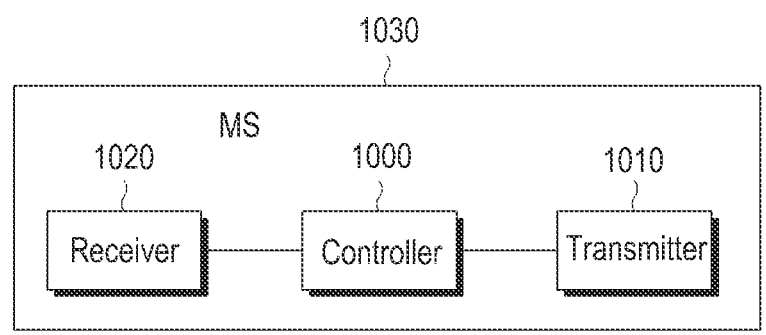
FIG. 10 is a block diagram illustrating a structure of a Mobile Station (MS) according to an exemplary embodiment of the present invention.

FIG. 10 is a block diagram illustrating a structure of a MS according to an exemplary embodiment of the present invention.

Referring to FIG. 10, the MS 1030 includes a controller 1000, a transmitter 1010 and a receiver 1020. The controller 1000 controls the transmitter 1010 and the receiver 1020, and controls operations of the MS 1030. And, the MS 1030 performs carrier switching according to exemplary embodiments of the present invention, as shown the FIGS. 1-8.

The transmitter 1010 and the receiver 1020 perform communication with the MS 1030 according to the controls of the controller 1000. Specifically, the transmitter 1010 performs message transmission operation for carrier switching of the MS, and the receiver 1020 performs message reception operation for carrier switching of the MS 1030.

While the invention has been shown and described with reference to certain exemplary embodiments thereof, it will be understood by those skilled in the art that various changes in form and details may be made therein without departing from the spirit and scope of this invention as defined by the appended claims and their equivalents.

What is claimed is:

1. A method for performing carrier switching by a terminal in a wireless communication system using multi-carriers, the method comprising:

receiving, from a base station (BS), a first message for requesting carrier switching between a primary carrier and a secondary carrier;

transmitting, to the BS, a second message including multicast broadcast service (MBS) connection information related to at least one MBS to be received by the terminal; receiving, from the BS, a third message including information for the carrier switching; and performing the carrier switching based on the information for the carrier switching, wherein the information for the carrier switching includes bitmap information determined by using the MBS connection information, wherein the bitmap information indicating when the terminal is available in the primary carrier using at least one bit, wherein each bit included in the at least one bit corresponds to a time interval in a MBS scheduling interval, the each bit is set to one of a first value and a second value, and wherein the first value indicates that the terminal is available for MBS data scheduling in the secondary carrier and the second value indicates that the terminal is available for unicast scheduling in the primary carrier.

2. The method of claim 1, wherein the information for the carrier switching includes information on a carrier switching start time.

3. The method of claim 1, wherein the second message includes an MBS zone ID indicating an MBS zone that the terminal receives MBS data.

4. The method of claim 1, further comprising:

updating the MBS connection information according to a change of the at least one MBS, if the at least one MBS is changed;

transmitting, to the BS, a fourth message including the updated MBS connection information;

receiving, from the BS, a fifth message including updated information for the carrier switching determined by using the updated MBS connection information; and performing the carrier switching based on the updated information.

5. The method of claim 2, wherein the carrier switching start time includes information on a superframe number at which the carrier switching happens.

6. A method for performing carrier switching scheduling by a base station (BS) in a wireless communication system using multi-carriers, the method comprising:

transmitting, to a terminal, a first message for requesting carrier switching between a primary carrier and a secondary carrier;

receiving, from the terminal, a second message including multicast broadcast service (MBS) connection information related to at least one MBS to be received by the terminal; and transmitting, to the terminal, a third message including time information for the carrier switching, wherein the information for the carrier switching includes bitmap information determined by using the MBS connection information, wherein the bitmap information indicating when the terminal is available in the primary carrier using at least one bit, wherein each bit included in the at least one bit corresponds to a time interval in a broadcast service scheduling interval, the each bit is set to one of a first value and a second value, and wherein the first value indicates that the terminal is available for MBS data scheduling in the secondary carrier and the second value indicates that the terminal is available for unicast scheduling in the primary carrier.

7. The method of claim 6, wherein the information for the carrier switching includes information on a carrier switching start time.

8. The method of claim 7, wherein the second message includes an MBS zone ID indicating an MBS zone that the terminal receives MBS data.

9. The method of claim 6, further comprising:
if a fourth message including an updated MBS connection information according to a change of the at least one MBS is received from the terminal, determining updated information for the carrier switching by using the updated MBS connection information; and
transmitting, to the terminal, a fifth message including the updated information.

10. The method of claim 7, wherein the carrier switching start time includes information on a superframe number at which the carrier switching happens.

11. A terminal in a wireless communication system using multi-carriers, the terminal comprising:
a receiver configured to receive, from a base station (BS), a first message for requesting carrier switching between a primary carrier and a secondary carrier;
a transmitter configured to transmit a second message including multicast broadcast service (MBS) connection information related to at least one MBS to be received by the terminal; and
a controller configured to, if a third message including information for the carrier switching is received from the BS, perform the carrier switching based on the information for the carrier switching,
wherein the information for the carrier switching includes bitmap information determined by using the MBS connection information,
wherein the bitmap information indicating when the terminal is available in the primary carrier using at least one bit,
wherein each bit included in the at least one bit corresponds to a time interval in a MBS scheduling interval, the each bit is set to one of a first value and a second value, and
wherein the first value indicates that the terminal is available for MBS data scheduling in the secondary carrier and the second value indicates that the terminal is available for unicast scheduling in the primary carrier.

12. The terminal of claim 11, wherein the information for the carrier switching includes information on a carrier switching start time.

13. The terminal of claim 11, wherein the second message includes an MBS zone ID indicating an MBS zone that the terminal receives MBS data.

14. The terminal of claim 11, wherein the controller updates the MBS connection information according to a change of the at least one MBS, if the at least one MBS is changed, controls the transmitter to transmit, to the BS, a fourth message including the updated MBS connection information, controls to receive, from the BS, a fifth message including updated information for the carrier switching determined by using the updated MBS connection information, and performs the carrier switching based on the updated information.

15. The terminal of claim 12, wherein the carrier switching start time includes information on a superframe number at which the carrier switching happens.

16. A base station (BS) in a wireless communication system using multi-carriers, the BS comprising:
a transmitter configured to transmit, to a terminal, a first message for requesting carrier switching between a primary carrier and a secondary carrier;
a receiver configured to receive, from the terminal, a second message including multicast broadcast service (MBS) connection information related to at least one MBS to be received by the terminal; and
a controller configured to control the transmitter for transmitting, to the terminal, a third message including information for the carrier switching,
wherein the information for the carrier switching includes bitmap information determined by using the MBS connection information,
wherein the bitmap information indicating when the terminal is available in the primary carrier using at least one bit,
wherein each bit included in the at least one bit corresponds to a time interval in a broadcast service scheduling interval, the each bit is set to one of a first value and a second value, and
wherein the first value indicates that the terminal is available for MBS data scheduling in the secondary carrier and the second value indicates that the terminal is available for unicast scheduling in the primary carrier.

17. The BS of claim 16, wherein the information for the carrier switching includes information on a carrier switching start time.

18. The BS of claim 16, wherein the second message includes an MBS zone ID indicating an MBS zone that the terminal receives MBS data.

19. The BS of claim 16, wherein the controller, if a fourth message including an updated MBS connection information according to a change of the at least one MBS is received from the terminal, determines update information for the carrier switching by using the updated MBS connection information, and controls the transmitter for transmitting, to the terminal, a fifth message including the updated information.

20. The BS of claim 16, wherein the carrier switching start time includes information on a superframe number at which the carrier switching happens.

* * * * *